(12) United States Patent
Grandin et al.

(10) Patent No.: US 6,378,132 B1
(45) Date of Patent: Apr. 23, 2002

(54) SIGNAL CAPTURE AND DISTRIBUTION SYSTEM

(75) Inventors: David J. Grandin, Nashua; John L. Barkley, Hudson; David A. Glover, Nashua, all of NH (US)

(73) Assignee: Avid Sports, LLC, Lowell, MA (US)

( * ) Notice: Subject to any disclaimer, the term of this patent is extended or adjusted under 35 U.S.C. 154(b) by 0 days.

(21) Appl. No.: 09/377,129

(22) Filed: Aug. 19, 1999

Related U.S. Application Data

(60) Provisional application No. 60/135,332, filed on May 20, 1999.

(51) Int. Cl.$^7$ ............................ H04N 7/16; H04N 5/222
(52) U.S. Cl. ...................... 725/146; 348/722; 725/138; 725/145
(58) Field of Search ............................... 725/32, 86, 92, 725/93, 91, 114, 115, 116, 138, 144, 145, 146; 348/722

(56) References Cited

U.S. PATENT DOCUMENTS 5,717,468 A  * 2/1998  Baryla ........................ 348/563
5,729,471 A    3/1998  Jain et al.
5,745,126 A    4/1998  Jain et al.
5,767,893 A    6/1998  Chen et al.
6,144,375 A    11/2000 Jain et al.

* cited by examiner

*Primary Examiner*—John W. Miller
(74) *Attorney, Agent, or Firm*—Fish & Richardson P.C.

(57) ABSTRACT

A system that relates annotations captured at an event and continuous signal recordings, such as video recordings, of the event in such as way that once the recordings and annotations are distributed to a remote site, an operator does not have to manually identify the time intervals of individual segments that are identified in the annotations. Prior to distribution to the remote sites, the annotations that are collected for the event are processed to identify a series of time segments, including a time interval of the signal recordings. The time reference for these identified time intervals is based on the signal recordings themselves, for example, being relative to a time reference marks that are introduced into the video recordings before they are distributed to the remote site, or being based on an recorded time signal. At the remote sites, the time references for the video recordings are determined, for example by locating the time reference marks, and the distributed annotations are used to automatically segment the video recordings.

31 Claims, 13 Drawing Sheets

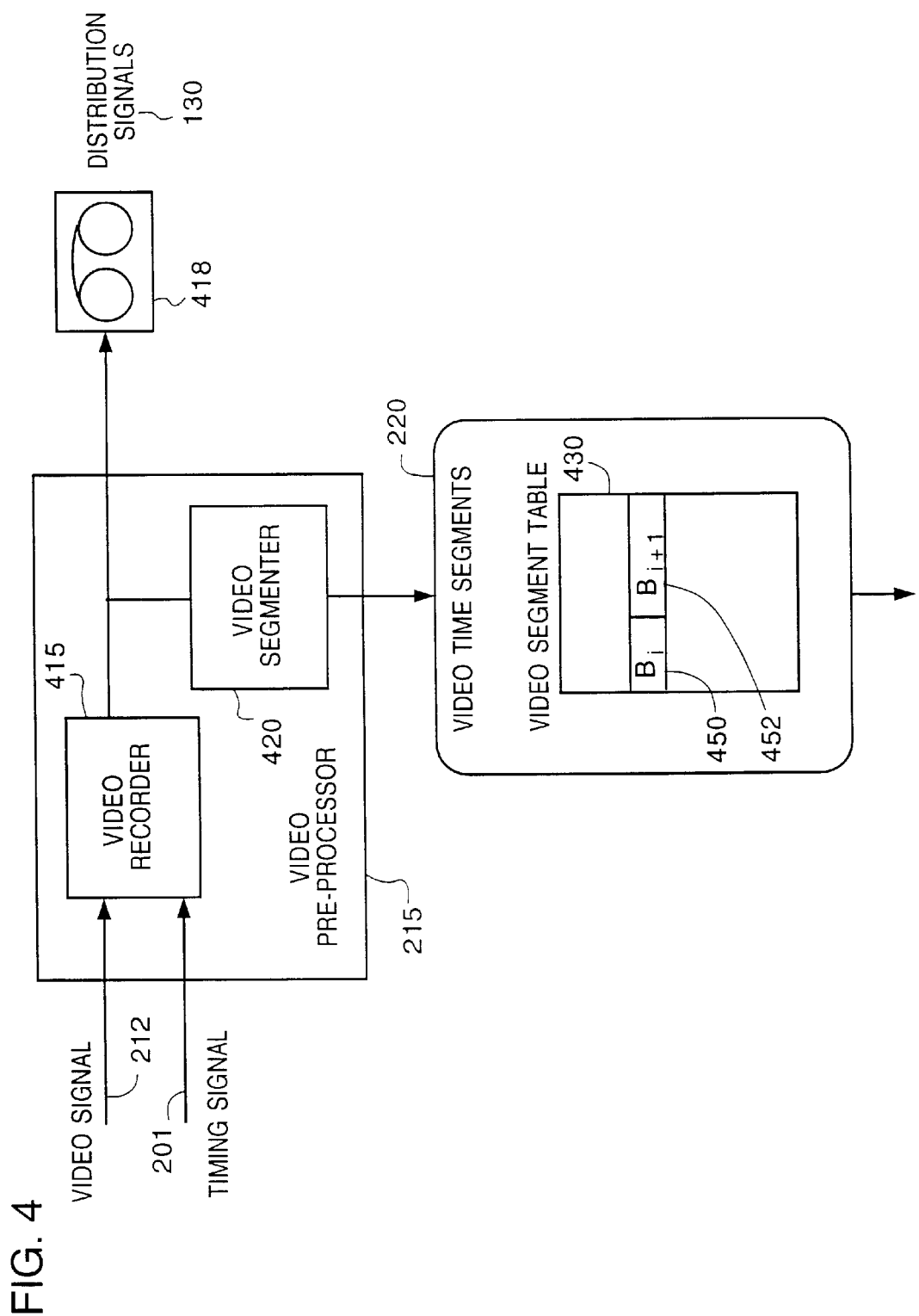

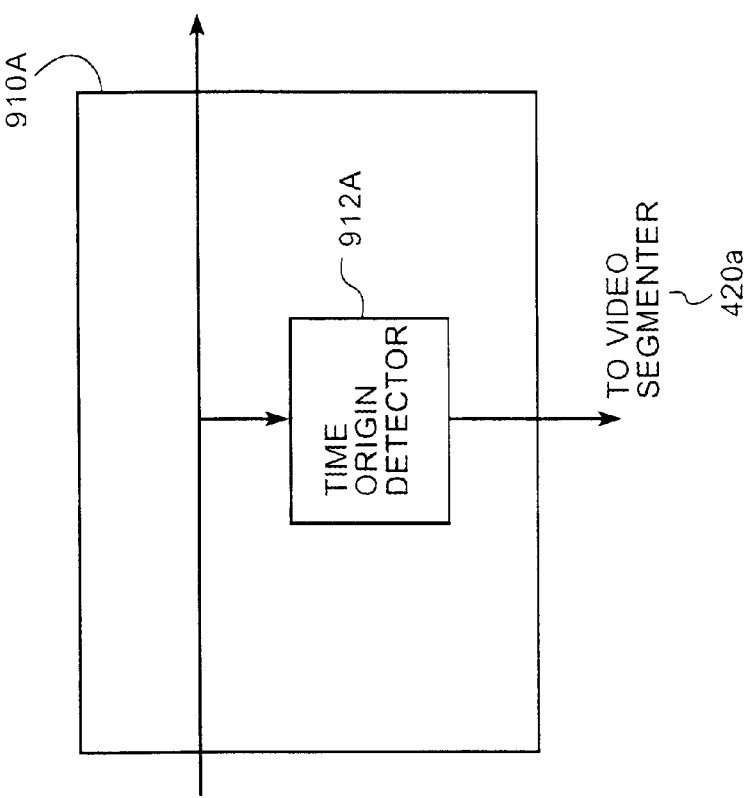
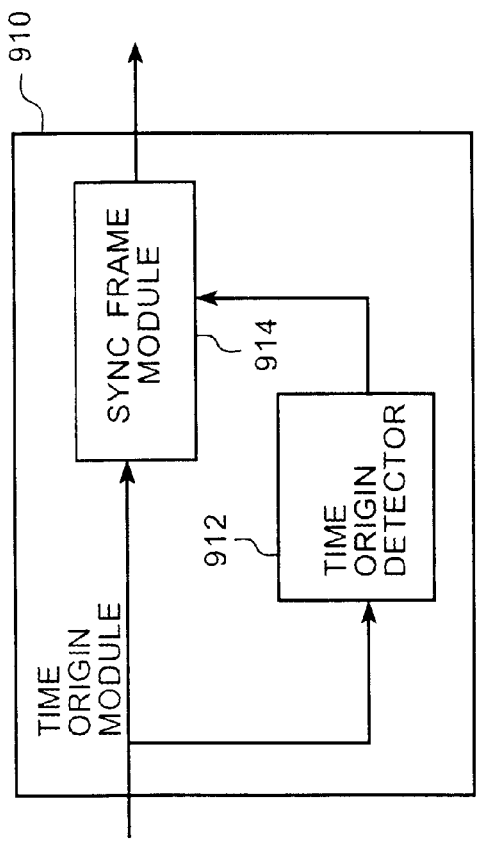
FIG. 9B
FIG. 9C

SIGNAL CAPTURE AND DISTRIBUTION SYSTEM

This Application claims benefit of Provisional No. 60/135,332 filed May 20, 1999.

BACKGROUND

This invention relates to a system for capturing and subsequently distributing continuous signal.

Sporting events, such as games of football or basketball, are typically captured by cameras that are used to produce video recordings of the event. The events may also be annotated, for example, with "play-by-play" annotations collected by an observer of the event. The video recordings are distributed to a number of remote sites, for example over private or public television broadcast systems, or on physical media, such as magnetic tapes (e.g., Betacam-SP format). The annotations are also sent to the remote sites, for example, as text printed on paper. At the remote sites, the video recordings are processed to access particular segments of the recordings, such as segments corresponding to plays in a football game. For example, the video recordings are inputted to a video processing system, such as a SportsPro system from Avid Sports, LLC, or Lowell, Massachusetts. In that system, the time intervals of individual segments of the video recordings are manually identified by an operator of the system optionally using the printed annotations as a guide. The operator can also add further annotations corresponding to the time segments in order to allow subsequent access based on the annotations. When the time segments correspond to plays in a game, the received annotations may identify the team and the type of play, while the players involved in each play may be added by the operator at the remote site. This allows the operator to access time segments that, for example, have plays involving a particular player. In the SportsPro system, the operator can also input data about events in a game according to a format defined by Information and Display Systems, Inc. In that format, each event is associated with a time such that the relative time between events can be determined. The operator manually aligns the events with the video recordings, and the information about the events can be associated with the time segments within which the events occur.

In several professional sports leagues, the teams that participate in an event receive the video recordings and the annotations of that event. The teams are then responsible for providing a processed version of the recordings to subsequent opponents prior to the games with those opponents to facilitate their preparation for those games. For instance, a team may be required to provide processed video recordings of a game to their opponents in each of their next two games. The processing may include concatenating video from multiple cameras, which had different points of view (camera angles), for each play of the game to form a new video recording, and providing new annotations that correspond to the processed video recording. When a team receives video recordings and annotations from an upcoming opponent, it also inputs the video into a video processing system and uses the annotations to manually find segments of the video recordings, which correspond to individual plays.

SUMMARY

In a general aspect, the invention is a system that relates annotations captured at an event and continuous signal recordings, such as video recordings, of the event in such as way that once the recordings and annotations are distributed to a remote site, an operator does not have to manually identify the time intervals of individual segments that are identified in the annotations. Prior to distribution to the remote sites, the annotations that are collected for the event are processed to identify a series of time segments, including a time interval of the signal recordings. The time reference for these identified time intervals is based on the signal recordings themselves, for example, being relative to a time reference marks that are introduced into the video recordings before they are distributed to the remote site, or being based on an recorded time signal. At the remote sites, the time references for the video recordings are determined, for example by locating the time reference marks, and the distributed annotations are used to automatically segment the video recordings.

In one aspect, in general, the invention is a method for capturing and distributing video information. The method includes accepting a video signal, identifying a time reference for the video signal, and segmenting the video signal into multiple video segments, including forming multiple time interval records each identifying a time interval relative to the time reference for each video segment. The method further includes accepting an annotation signal associated with the video signal and processing the annotation signal to form multiple annotation segments, each annotation segment corresponding to a time interval. The method also includes matching the annotation segments to the video segments, including updating the annotation segments using the time interval records of corresponding video segments. The video signal and the annotation segments are then distributed, for example over broadcast or network channels, or using physical media.

The method can include one or more of the following features:

Identifying a time reference for the video signal includes accepting a time signal, such as a SMTPE signal, in conjunction with the video signal and identifying a time value in the time signal to determine the time reference, and distributing the video signal includes distributing the time signal in conjunction with the video signal.

Identifying a time reference for the video signal includes selecting a point in the video signal using the images encoded in the video signal.

The method further includes marking the time reference in the images encoded in the accepted video signal, for example by replacing image frames in the video signal with predefined marking images.

Segmenting the video signal include identifying boundary times of the time intervals using images encoded in the video signal.

The method further includes receiving a data signal and segmenting the video signal includes identifying boundary times of the time intervals using the received data signal.

Processing the annotation signal includes identifying time boundaries of the annotation segments.

Processing the annotation signal includes forming descriptive information for each annotation segment from the annotation signal.

Accepting the annotation signal includes receiving text data encoding annotation information, and processing the annotation signal includes parsing the text data to identify the annotation segments.

Accepting the annotation signal includes receiving a speech signal and processing the annotation signal includes automatically recognizing the received speech signal.

The method further includes receiving a data signal and forming the annotation segments further includes processing the data signal to determine the time intervals of the annotation segments.

Matching the annotation segments to the video segments includes associating time intervals of the video segments with time intervals of the annotation segments.

Updating the annotation segments includes updating the boundary times of the annotation segments using the time boundaries of associated video segments.

The method can further include accepting the distributed video signal and accepting the distributed annotation segments, and identifying the time reference for the accepted video signal. The then further includes selecting one or more annotation segments and accessing video segments corresponding to the selected annotation segments.

The method can further include accepting a time signal in conjunction with the video signal and identifying the time reference for the accepted video signal includes identifying a reference time in the time signal.

Identifying the time reference for the accepted video signal includes locating a time reference marked in images encoded in the video signals.

Selecting the annotation segments includes accepting a query and matching the query with descriptive information associated with each of the annotation segments.

Distributing the annotation segments include sending the annotation segments to a server computer and accepting the annotation segments includes retrieving the annotation segments over a data network from the server computer.

The method can further include forming a second video signal from the accessed video segments and distributing the second video signal and the selected annotation segments.

In another aspect, in general, the invention is a system for capturing and distributing video information. The system includes a video processor for accepting a video signal and for segmenting the video signal into a plurality of video segments, an annotation processor for accepting an annotation signal associated with the video signal and for forming a plurality of annotation segments, and a segment matcher of associating time intervals associated with the video segments and time intervals associated with the annotation segments.

The annotation signal can include text data and the annotation processor then includes a parser for processing the text data to form the annotation segments.

In another aspect, in general, the invention is a system for processing video data. The system includes a signal storage for storing an accepting video signal, an annotation storage for storing accepted annotation data; and a synchronizer for associating a common reference time between the stored video signal and time intervals identified in the annotation data.

The system can further include a content selector coupled to the annotation storage and the video storage for accepting a query and selecting a plurality of time intervals of the stored video signal using descriptive information stored in the annotation storage for those time intervals.

Aspects of the invention have an advantage of not requiring each recipient of the video recordings and annotations to perform manual segmentation of the video recordings. Also, the video recordings can be distributed in a variety of ways, for example as television broadcasts or on magnetic tapes, and the annotations can be distributed independently of the video recordings. By using standard methods of video distribution, which typically do not have a provision for synchronized timing or annotation data, remote sites are able to access the video recordings using various alternative video processing systems that are not necessarily tied to a particular enhanced format that includes both the annotations and the video recordings.

Video data can be sent over a separate channel than annotation data related to the video signal. This has the advantage that the video data can be sent over a high capacity channel, such as a satellite channel, or using a standard interchange format. Also the invention has the advantage that the video data can be sent over a channel that does not have the capability of concurrently sending a time signal while still being able to resynchronize the annotations and video data.

Other features and advantages are apparent from the following description and from the claims.

DESCRIPTION OF DRAWINGS

FIG. 4 shows a video processor which produces data records of video time segments;

FIGS. 9B–C show alternative structure of a time origin module of the signal pre-processor.

DESCRIPTION

Figure 1:
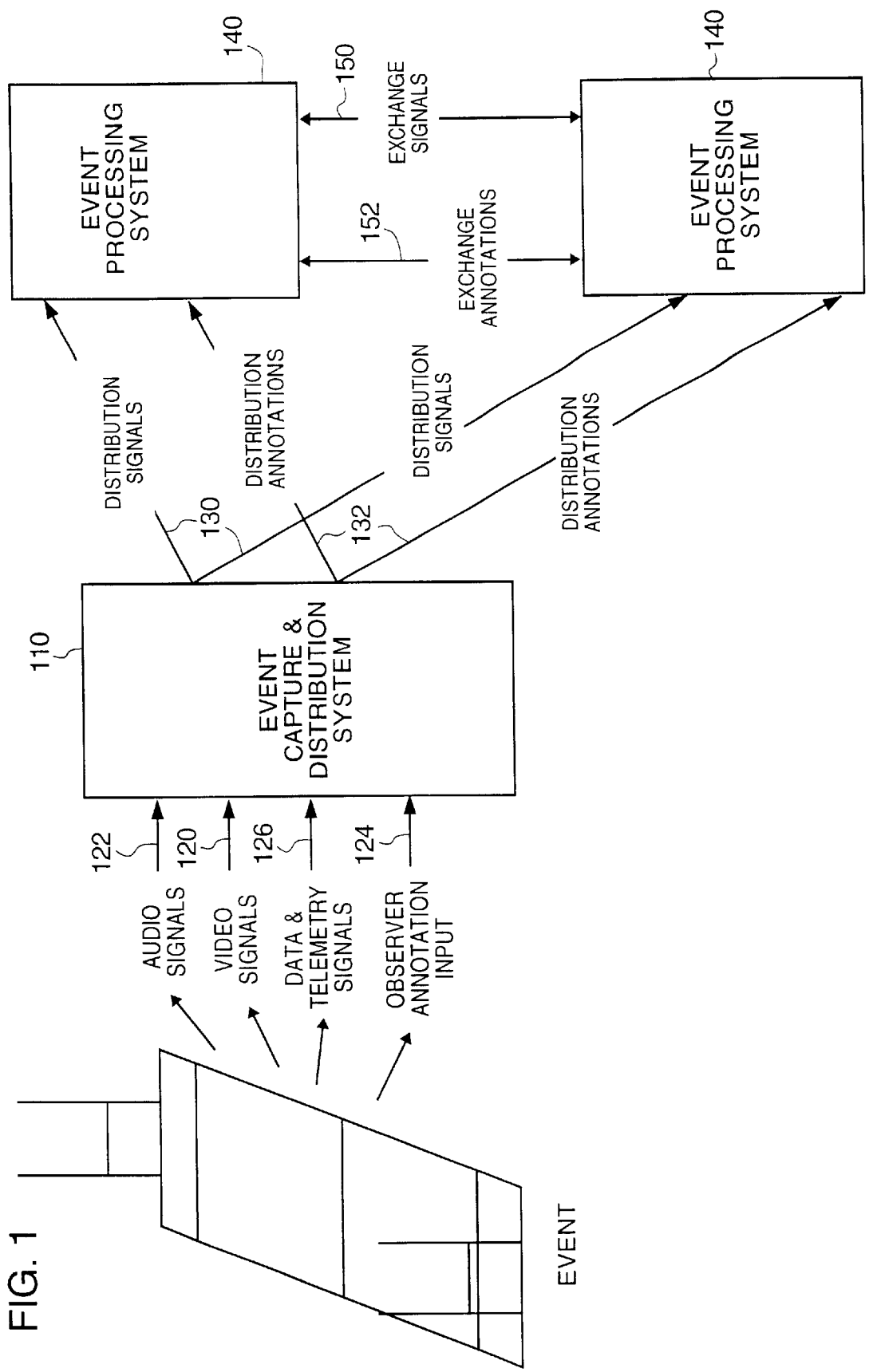
FIG. 1 is a block diagram a data capture and distribution system.

1 System Overview (FIG. 1)

Referring to FIG. 1, an event capture and distribution system includes an event capture system 110 and a number of event processing systems 140. Event capture system 110 is used to capture and distribute information from an event, such as a football or basketball game, or other sporting event. Event capture system 110 accepts a number of signals or other inputs from the event. These signals include continuous signals, such as video signals 120, audio signals 122, and, in some embodiments, data and telemetry signals 126, such as game clock data or remotely sensed player and ball position signals. Event capture system 110 also receives signals that provide, or that it uses to derive, descriptive information (annotations) about the event. For instance, the event capture system receives observer annotation input 124, which is provided by a human observer of the event. In some embodiments, in addition or as an alternative to observer annotation input 124, the descriptive information may come from data and telemetry signals 126, or may be derived from audio and video signals 122, 120 themselves, for example, using automatic signal processing algorithms.

Event capture system 110 creates and provides distribution signals 130 to a number of event processing systems 140, which are typically geographically separated from event capture system 110. Distribution signals 130 are processed versions of the continuous signals received by the event capture system. Event capture system 110 also creates and provides to the event processing systems distribution annotations 132, which correspond to the provided distribution signals. For instance, in an exemplary application of the system for capturing football games, distribution signals 130 include video signals from a number of camera positions (e.g., from the side line and from the end zone), and distribution annotations 132 includes timing and other descriptive information about individual plays in the game. In this exemplary application, event processing systems 140 are each associated with one of the teams in a football league, and in particular, the two teams that play a game each receive the distribution signals and distribution annotations for that game.

Distribution annotations 132 includes references to time intervals in distribution signals 130, for example, the time interval associated with each play of a football game. Distribution signals 130 are such that a time origin (i.e., a timing reference point) can be determined from the signals themselves so that time references in distribution annotations 132 specify definite portions of the distribution signals. In various embodiments, distribution signals 130 are transmitted to the event processing systems 140 over a variety of channels. For instance, video signals are sent over a broadcast television system, or are recorded and delivered on magnetic tapes. Some of the channels provide an explicit mechanism for associating a timing reference with the continuous signal. An example of such a channel is recorded Betacam-SP tapes that include parallel timing tracks recorded along with the video tracks. Other channels do not necessarily provide such an explicit mechanism. For example, broadcast NTSC signals do not explicitly provide time reference information to the recipient. In embodiments that use such channels, event processing system 140 determines a time reference from the distribution signal itself, for example, from a video signal. Each event processing system 140 receives distribution signals 130 and distribution annotations 132, and either directly from explicit timing information in the distribution signals, of by another implicit mechanism, determines a time reference for the distribution signals that allows it to access time intervals in the distribution signals based on the times specified in the distribution annotations.

Each event processing system 140 processes the received distribution signals and annotation signals from one or more events, for example, by adding descriptive information, or by assembling related time intervals from the received distribution signals. For example, in the exemplary case of football games, a particular team might assemble all instances of a particular upcoming opponent using a particular play.

In some embodiments, after processing the received distribution signals 130 and distribution annotations 132, event processing system 140 is used to produce exchange signals 150 and exchange annotations 152, which are sent to one or more other event processing systems 140. For instance, exchange signals 150 may be an edited version of distribution signals 130 and this edited version is sent to an upcoming opponent to facilitate their preparation for playing the upcoming game. Exchange annotations 152, which correspond to exchange signals 150, are similar to distribution annotations 132 and provide descriptive information about the content of segments of exchange signals 150.

2 Event Capture and Distribution (FIGS. 2–5B)

Figure 2:
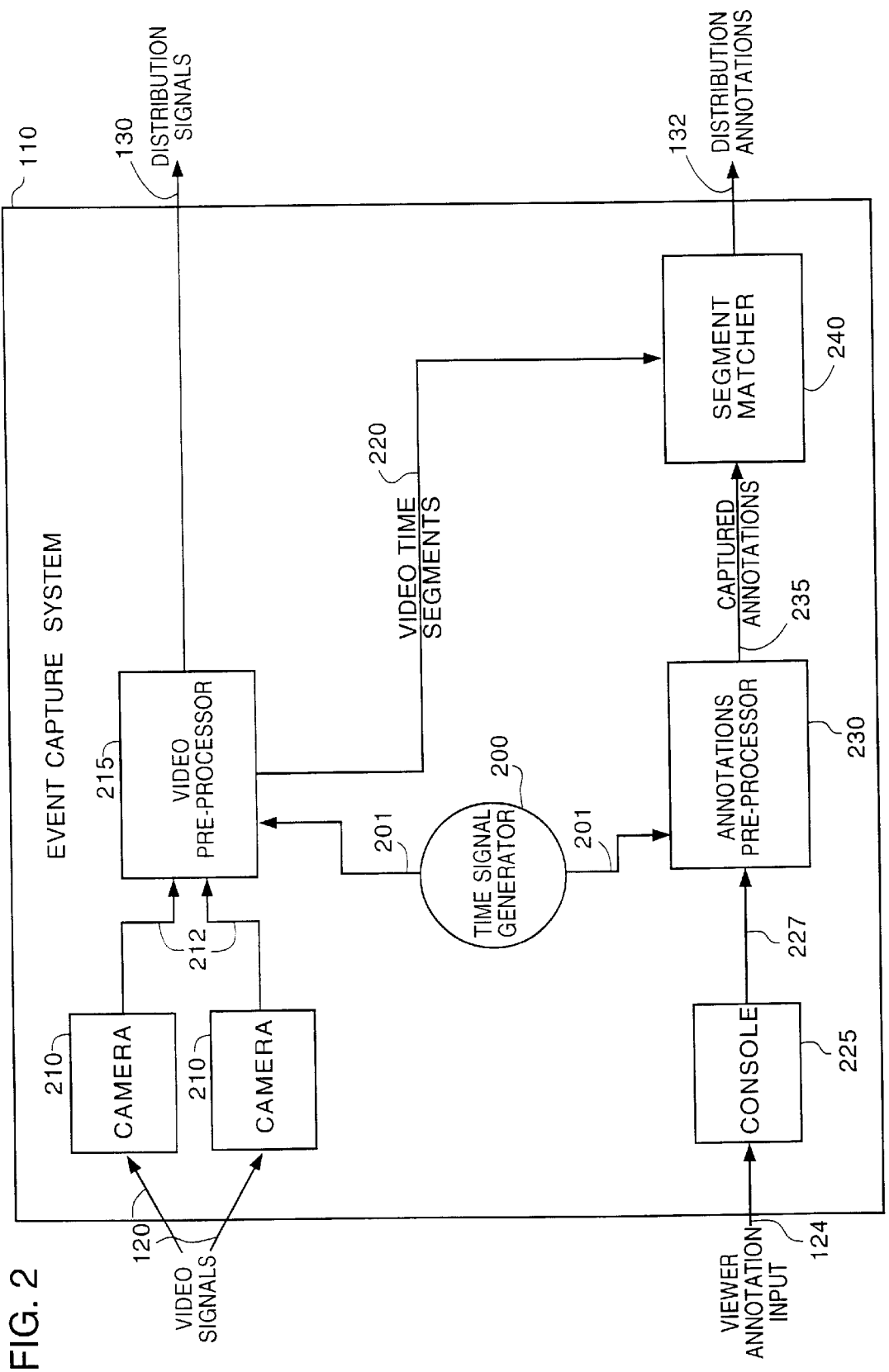
FIG. 2 is a block diagram of an event capture system.

Referring to FIG. 2, a first embodiment of event capture system 110 includes a number of cameras 210 that provide video signals 212 from the event. Video signals 212 are, for instance, NTSC standard analog signal. The video signals are passed to a signal pre-processor 215 that, as described further below, processes the signals to form distribution signals 130. Although this first embodiment is described having only video signals 120 input to cameras 210, other continuous signals, including but not limited to audio signals, and data and telemetry signals, could be processed in a similar manner.

Event capture system 110 also accepts observer annotation input 124 from an observer who views the event. In this embodiment, the observer types at a console 225, which outputs an annotation signal 227 which is in turn input to an annotations pre-processor 230. In the exemplary context of a football game, the information provided by the observer includes annotations regarding the game, including, for instance, which team has possession and information related to each play such as the type of play, which players were involved, and the outcome of the play. Annotation signal 227 is such that the relative elapsed time between two points in the signal can be determined from the signal itself. In this embodiment, console 225 asynchronously outputs characters as they are typed, for instance outputting ASCII characters according to the RS-232 signaling standard or outputting keyboard key-up and key-down codes over a cable connected to a computer which processes the key codes to determine which characters were typed. The relative time of two characters on annotation signal 227 determines the relative time of the corresponding keystrokes by the observer.

In order to synchronize the outputs of signal pre-processor 215 and annotations pre-processor 230, a time signal 201 that is generated by a time signal generator 200 is provided to both signal pre-processors 215 and annotations pre-processor 230. For example, time signal generator 200 generates a timing signal according to a SMPTE (Society of Motion Picture and Television Engineers) time code standard, which defines a continuous serial digital signal which includes hours, minutes, seconds, and frames relative to a fixed time origin. In alternative embodiments, rather than passing a time signal from a common time signal generator 200, synchronized time signals can be generated, for instance, based on GPS satellite transmissions.

Annotation signal 227 is fed to annotations pre-processor 230, which processes the annotation signal to produce captured annotations 235. Annotations processor 230 can be implemented in a number of ways. In this embodiment, annotations pre-processor 230 is a software process executing on a computer coupled to console 225. Annotations processor 235 analyzes intervals of annotation signal 227 that are related to individual segments of the event (e.g., plays), and for each of those intervals creates a record in captured annotations 235 that identifies the time interval of the segment based on time signal 201 that it received from time signal generator 200. Optionally, annotations preprocessor also identifies attributes of the segment based on the annotations signal.

Figure 3:
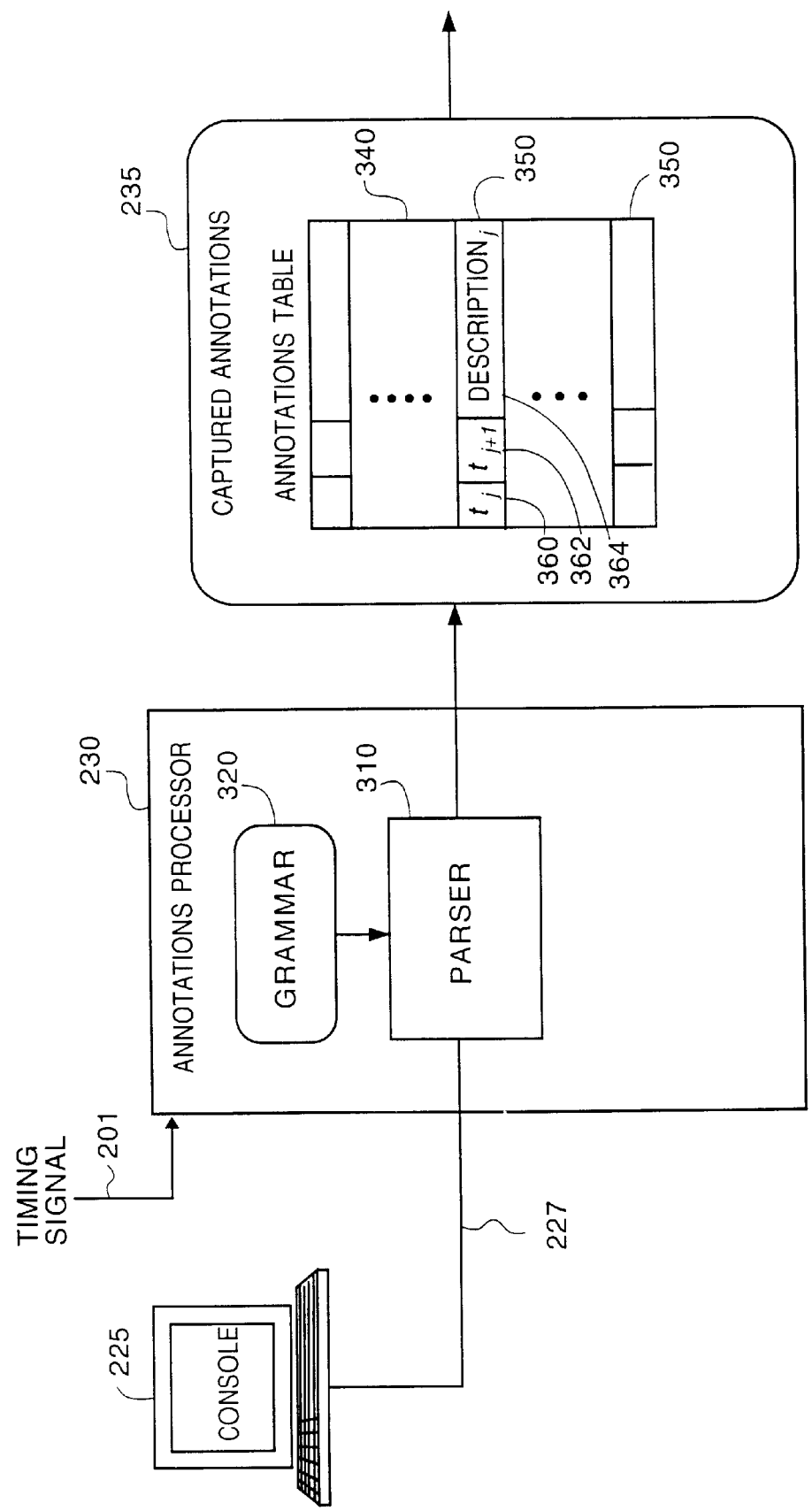
FIG. 3 shows an annotation processor which produces captured annotations using a input from a console.

Referring to FIG. 3, in this embodiment in which annotation signal 227 is a signal of asynchronously transmitted characters from console 225, annotations pre-processor 230 identifies sequences of the typed characters that correspond to individual segments of the event, such as plays in a football game. Annotations processor 230 receives time signal 201 from time signal generator 200. Based on this time signal, the time interval during which the characters were typed for an segment determine the time interval identified with that segment in captured annotations 235.

Captured annotations 235 include information associated with each segment that is identified by annotations preprocessor 230. In this embodiment, each segment is associated with a captured segment record 350, and these records are arranged in a table, annotations table 340. Each captured segment record 350 includes the start time 360 and end time 362 of the segment, determined from time signal 201, and an optional captured description 364 of the segment. In alternative embodiments, other arrangements of the information associated with each segment are used. For instance, alternating records of boundary times between segments, and descriptions of the segments can be used.

Annotations pre-processor 230 includes a parser 310 that makes use of a grammar 320, which provides a description of the syntax of the character sequences typed by the observer. In particular, grammar 320 provides the information needed for parser 310 to identify for each segment a character that occurs at or near the start of the segment and a character that occurs at or near the end of the segment. For example, an example of a character sequence typed to annotate a basketball game is "J 3 3 M" which signifies that player number 33 has attempted a jump shot and that he then made (M) the shot. The instant that the observer types the "M" is taken to be the end of a segment in which one team has possession. Various character codes signify changes in possession, which in this approach to annotating a basketball game, correspond to boundaries between segments, that is, each segment extends in time from one change in possession to another, or to game events such as time outs or ends of game periods. More complex annotation syntax can be used, and the character associated with the time of the end of a segment may not necessarily be the last character typed to describe a segment. For example, in football, a character sequence may signify that a tackle has occurred, and therefore indicates the end time of a segment, but descriptive information such as the number of the player who made the tackle may be entered after the end time of the segment.

In alternative embodiments, the observer provides annotation input in other ways. For instance the observer provides information by speaking into a microphone and having the system use a speech recognizer to interpret the spoken information. In yet other alternative embodiments, the annotations pre-processor automatically processes data and telemetry signals without necessarily requiring input from the observer. One example of such automated processing includes processing a data signal which encodes a game clock and determining boundaries of segments when the game clock is stopped between plays. Another example is processing telemetry signals which encode the identities and positions of players on a field to automatically determine descriptive information about a play such the players involved in a play or the player formation used in a play.

Referring again to FIG. 2, signal pre-processor 215 accepts video signals 212 from cameras 210. One output of signal pre-processor 215 is video time segments 220 which identify a sequence of time intervals, the time values being based on time signal 201, associated with individual segments of the event. In the case a football game, these segments would typically be the individual plays of the game. A segment matcher 240 accepts video time segments 220 as well as captured annotations 235, which includes time intervals for annotation records 350 that were generated from annotation signal 227 (see FIG. 3). As described fully below, segment matcher 240 matches the video time segments with the annotation records to produce distribution annotations 132. One purpose of this matching is to improve the accuracy of the time intervals associated with the segments by using relatively more accurate boundaries based on the video signals rather than relying only on the annotation input, which may have significant and varying latency caused by delay inherent in human input by the observer.

Another output of signal pre-processor 215 is distribution video 130, which is sent to one or more remote sites. In this embodiment, signal pre-processor 215 includes a video recorder 415 that records video signals 212 onto magnetic tape in a format that includes time signal 201. For example, video recorder 415 produces a Betacam-SP tape with a longitudinal timing track used to record time signal 201. The recorded tapes are sent to the remote sites and input to event processing systems 140 (FIG. 1).

Signal pre-processor also includes a video segmenter 420 which receives the video signals, in this embodiment after recording onto magnetic tape, and outputs video time segments 220, which identify the time intervals of the segments. Video time segments 220 includes segment table 430 that has one video segment record 440 for each segment of the event. Each time segment record 440 includes a start time 450 and an end time 452 of a corresponding segment specified according to the recorded time signal 201. Video segmenter 420 can be implemented in a number of ways. In this embodiment, the recorded tapes are input into a video processing system, such as an Avid Sports SportsPro system, and an operator manually identifies the boundaries of each play of the game by visually scanning the video. The distribution video is buffered in the system thereby allowing the operator to determine the boundaries by viewing the sequence of video frames slower than real time, for example, by stepping through individual frames of the signal. In an alternative embodiment, segmentation is performed without the aid of a human operator. For instance, video-processing techniques are used to automatically identify segment boundaries based on the content of the video signals, or using other inputs, such as a data signal encoding the game clock.

Figure 5A:
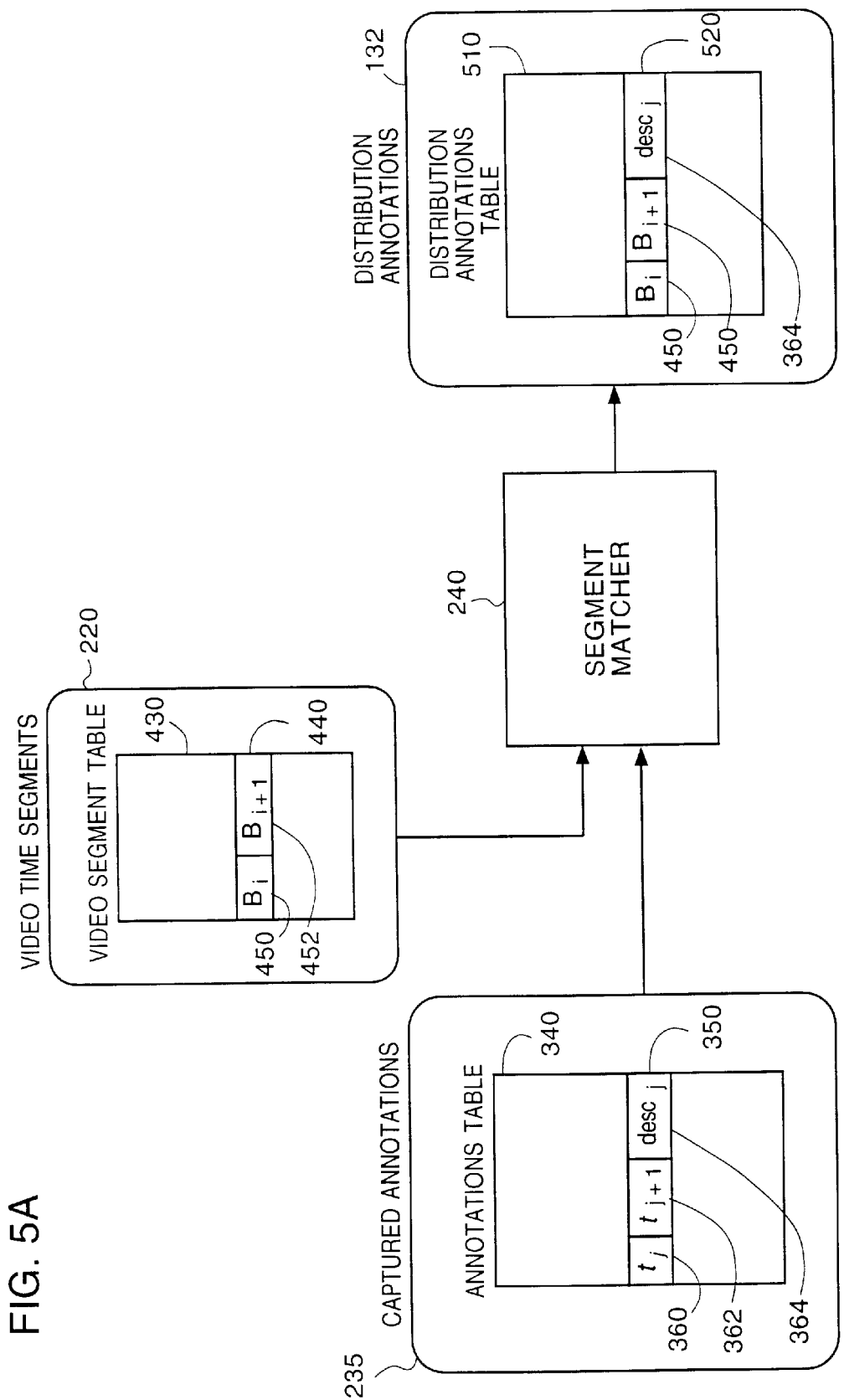
FIG. 5A shows a segment matcher which combines captured annotations and video time segments to produce distribution annotations.

Referring to FIG. 5A, segment matcher 240 (see FIG. 2) associates individual captured segment records 350 with particular video segment records 440 to produce distribution annotations 132. Distribution annotations 132 includes distribution annotations table 510, which includes a number of distribution segment records 520. Each distribution segment record 520 includes a segment description 364 from a captured segment record 350 and a start time 450 and an end time 452 from a corresponding the video segment record 440.

Figure 5B:
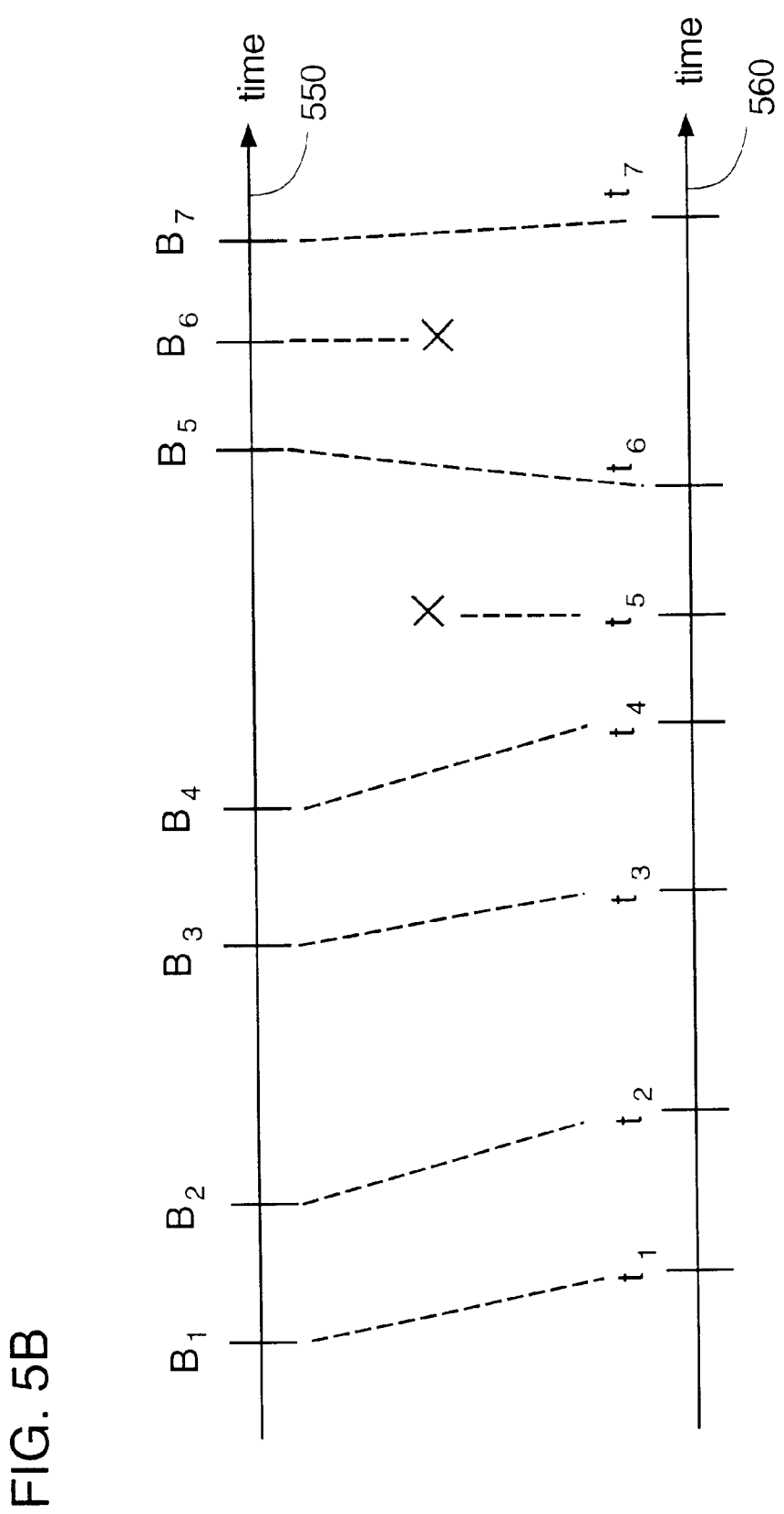
FIG. 5B illustrates operation of the segment matcher.

Referring to FIG. 5B, the matching process carried out by segment matcher 240 can be understood with reference to two time lines. Time line 550 is associated with video signal 212, and boundaries of video segments are indicated as $f_1$ through $f_7$, measuring time from the time origin of time signal 201. Time line 560 is associated with annotation signal 227, and boundaries $t_1$ through $t_7$ indicate boundaries between annotation segments. Note that in general, the segment intervals are not precisely identical. One cause is the latency of the observer typing the annotations on console 225. If the number of segments in the video signal and in the annotation signal are the same, and the relative timing of the boundaries between the segments are approximately the same, then matching annotation segments with video segments is straightforward. However, in practice, this is not the case, due to a number of factors, including:

- An annotation segment which corresponds to multiple video segments (a missed annotation segment boundary),
- A video segment that corresponds to multiple annotation segments (a missed video segment boundary), and
- Time skew between the end of a video segment, and the end of a corresponding annotation segment, due for example, to the latency between the observer viewing a play and his entering an annotation for the play.

Figure 6:
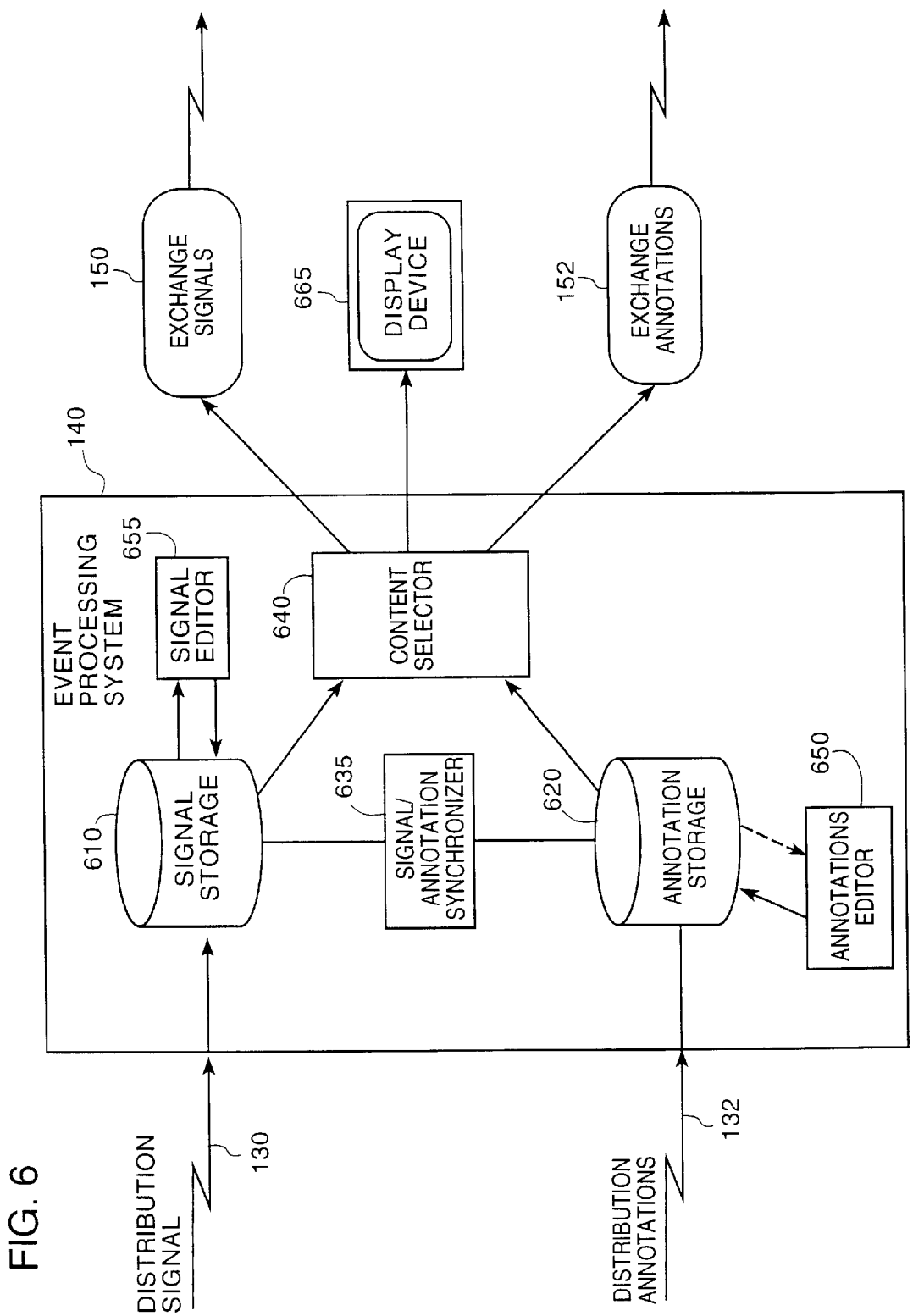
FIG. 6 is a block diagram of an event processing system.
Figure 7:
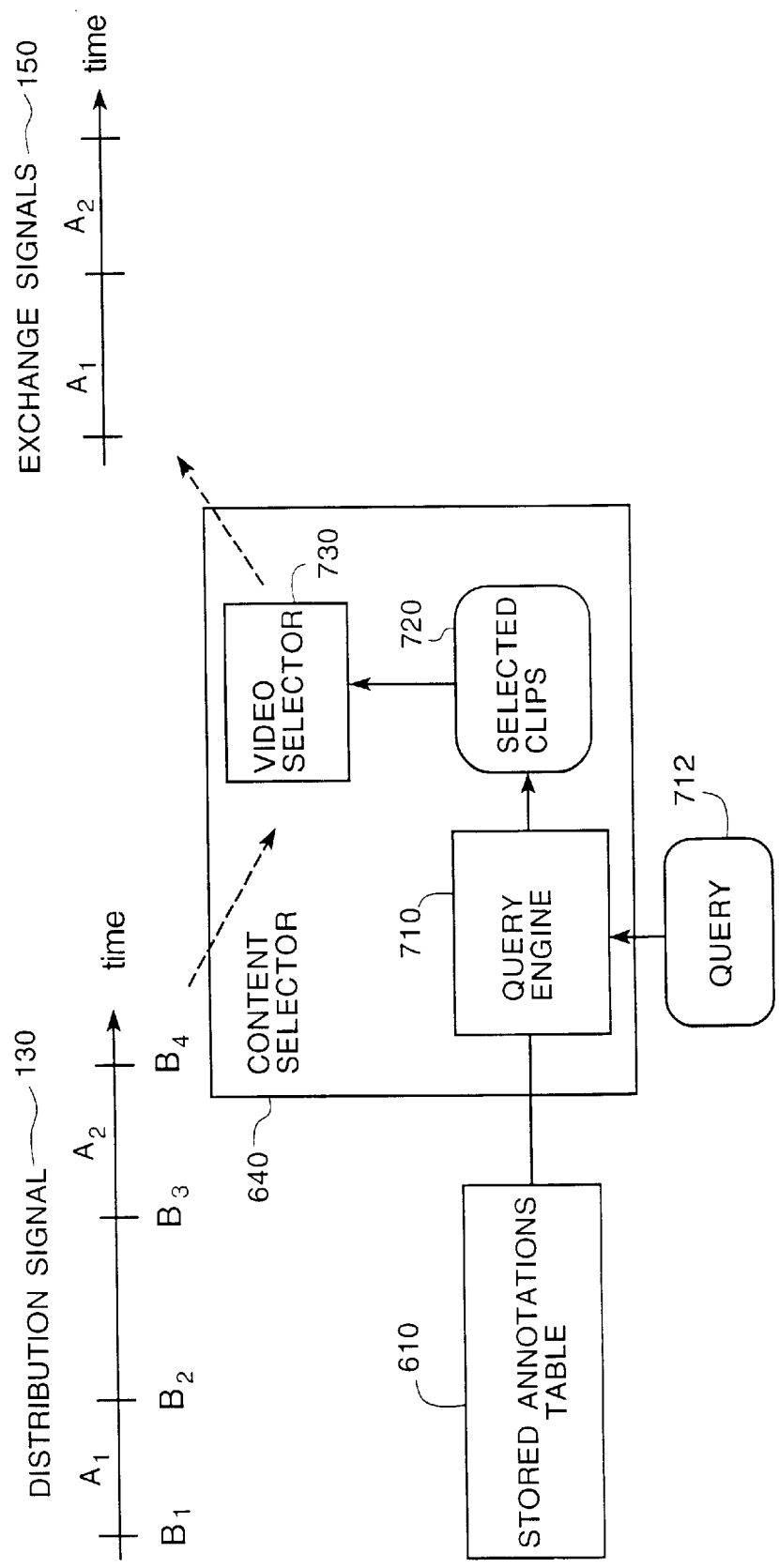
FIG. 7 illustrates the operation of a content selector of the data processing environment in which a number of video segments are selected using a query.

3 Event Processing Systems (FIGS. 6–7)

Referring to FIG. 6, distribution signals 130 and distribution annotations 132 are received at a remote site by event processing system 140. Internally, event processing system 140 includes a signal storage 610 that holds the received distribution signals. In this embodiment, distribution signals 130 are provided recorded on magnetic tapes that include the original time signal. The video signals are read from the tapes, and stored in signal storage 610 such that portions of the video signals can be accessed according to the original time signal. In this embodiment, signal storage 610 is a magnetic disk storage that holds the video signals in compressed digital form, for example using the Motion JPEG format. Event processing system 140 also includes an annotation storage 620 that holds the received distribution annotations 132. In this embodiment, annotation storage is also a magnetic disk storage.

Figure 6A:
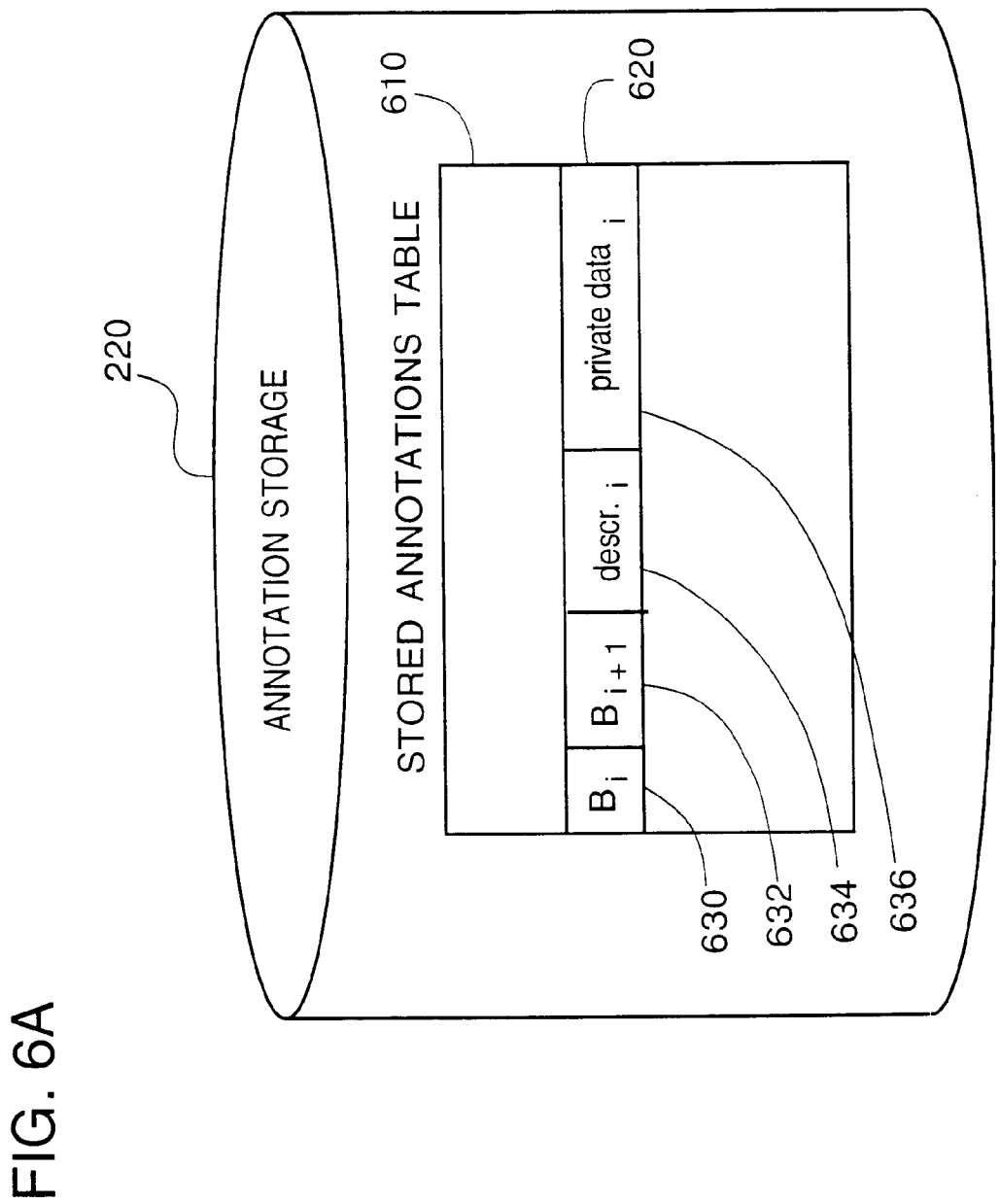
FIG. 6A illustrates the format of stored annotations records in the annotations storage of the data processing environment.

Referring to FIG. 6A, annotation storage 620 includes a stored annotations table 610 that includes stored annotation records 620, one record for each record in the received distribution annotations. For example, stored annotations table 610 is a database file with individual records for each segment identified in the distribution annotations. Each stored annotation record 620 includes a starting time 630 and an ending time 632 for the segment, relative to the time origin of the distribution signals 130, and a description 634 from the distribution annotations. Each stored annotation record 620 also includes private data 636 that is not received with the distribution annotations, but rather that is added after the distribution annotations and distribution video is received by event processing system 140. Both description 634 and private data 636 correspond, in general, to multiple database fields.

Referring again to FIG. 6, event processing system 140 includes a number of logical modules, including a signal/annotations synchronizer 635 that matches the intervals identified in stored annotations table 610 (FIG. 6A) with the video signals in signal storage 610.

Event processing environment 140 also includes a content selector 640. Content selector 640 combines the beginning and ending time of a segment from a stored annotation record 620 (FIG. 6A) and then retrieves the video segment and, for instance, displays the retrieved segment on a display device 665, such as a video monitor. Event processing environment 140 also includes an annotations editor 650 that allows an operator to edit the data stored in annotation storage 620 and a signal editor 655 that allowed editing of sequences of video frames in signal storage 610. Annotations editor 650 allow an operator to amend field values of description 634 or private data 636 in a stored segment record 620. Examples of typical fields private data 636 include subjective notations that would be particular to a team, such as assessments of another teams strong or weak points.

Referring to FIG. 7, content selector 640 performs a database search function using stored annotations table 610. Logically, content selector 640 includes a query engine 710 that accepts a query 712, which is typically input by an operator. For example, the query may specify all segments in which a particular player carried the ball in a particular football game. Query engine 710 accesses stored annotation table 610 and identifies the segments that match the query. In the illustration in FIG. 7, distribution signals 130 includes two segments, A1 and A2, that match the query. Query engine 710 produces selected clips 720, which is data that identifies the segments. A video selector 730 accesses the segments from video storage 610 (FIG. 6) and outputs a exchange signals 150 that includes only the selected video segments.

Note that video storage 610 may, in some embodiments, include distribution signals 130 that was received on different occasions, for example, from different football games. Annotation storage 220 would then include annotations from the different games, and content selector 240 would be able to access segments from the multiple occasions in a single query.

Figure 8:
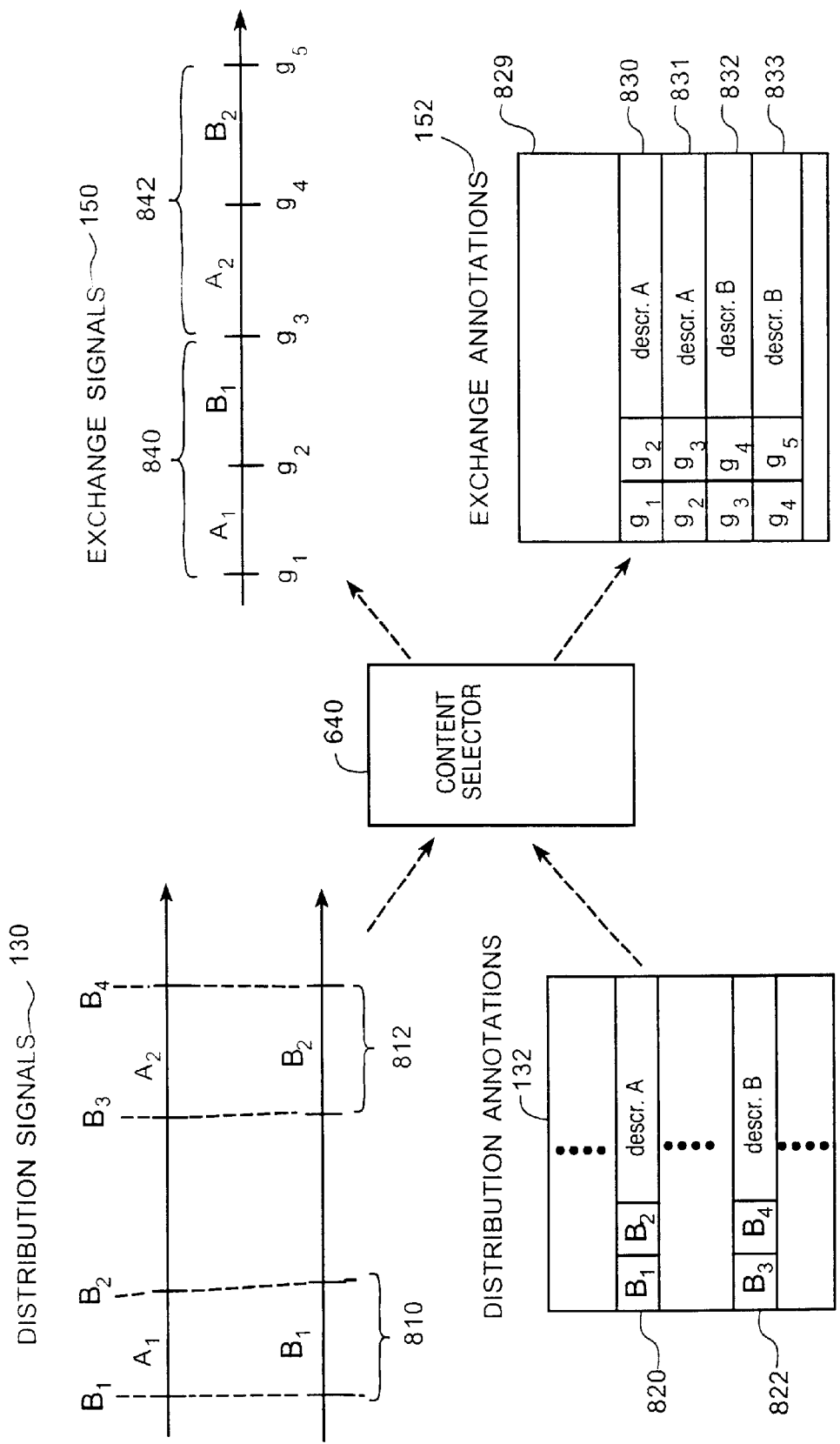
FIG. 8 illustrates the operation of the content selector in which a master video and a corresponding master annotations signal are composed from distribution video and distribution annotations.
Figure 8A:
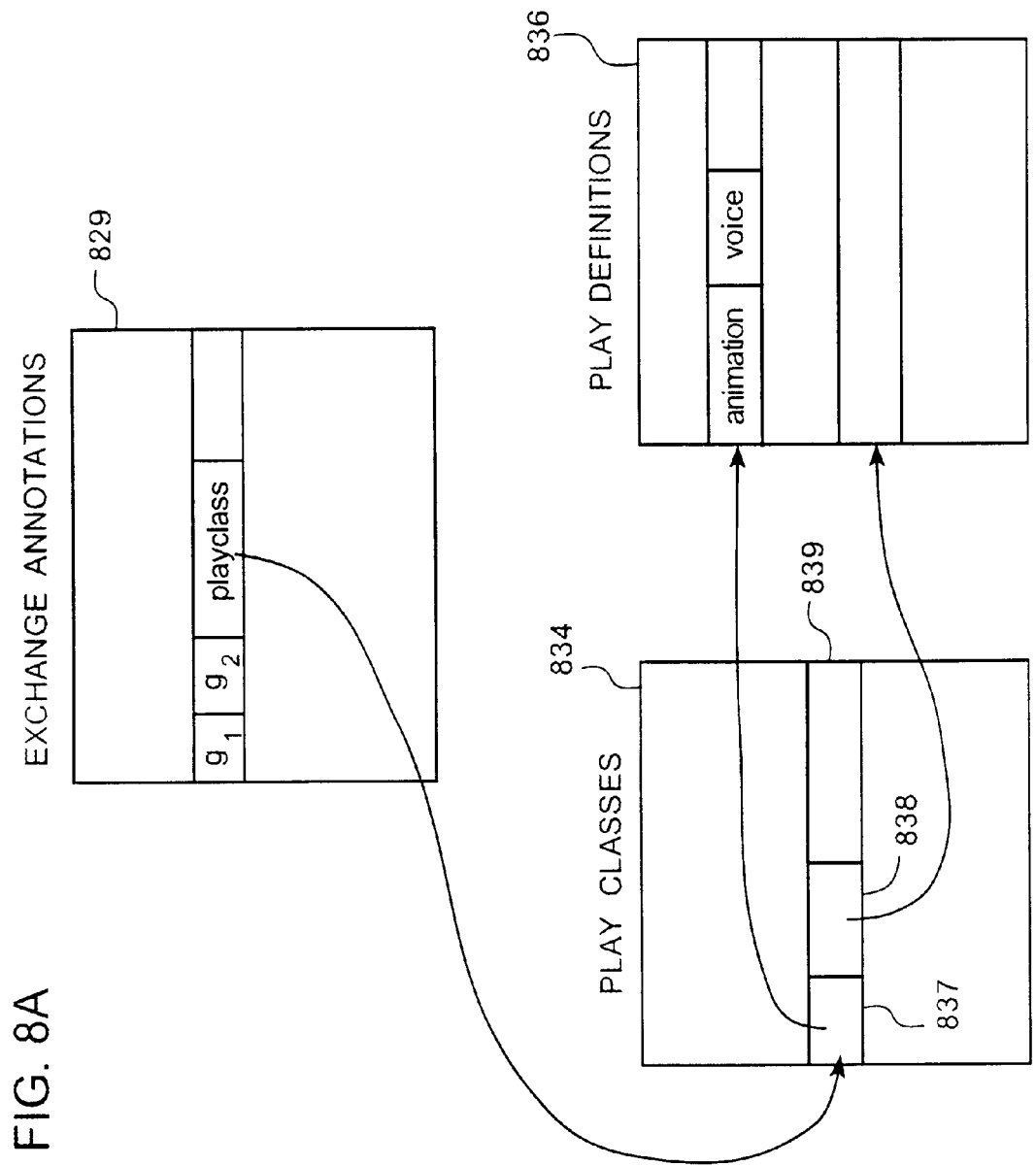
FIG. 8A illustrates a data structure for exchange annotations.

4 Data Exchange (FIGS. 8–8A)

Referring back to FIG. 1, event processing systems 140 have the capability of generating and exchanging exchange signals 150 and exchange annotations 152 that correspond to those exchange signals. Referring to the illustrative example shown in FIG. 8, distribution signals 130 includes multiple video signals of an event, for instance, recordings of a football game from a sideline and an end zone point of view. Content selector 640 retrieves the multiple recordings of each segment, for instance $A_1$ and $B_1$ which span frames $f_1$ to $f_2$ in the distribution video, and creates exchange signals 150 with a concatenation of $A_1$ and $B_1$ which spans frames $g_1$ to $g_3$. In this embodiment, exchange signals 150 are recorded onto a magnetic tape that includes a time signal that is generated by the event processing system. Content selector 240 also creates exchange annotations 152. Exchange annotations 152 includes a table 829 one record for each retrieved segment. For instance, exchange annotations 152 includes a record 830 that identifies the interval $g_1$ to $g_2$ (relative to timing signal recorded with exchange signals 150) and the description of the segment originally found at frames $f_1$ to $f_2$ in the distribution video.

Exchange signals 150 and exchange annotations 152 are then provided to another event processing system 140 where they can be stored in the signal storage and annotation storage, respectively. As with the distribution video and distribution annotations, the master video and master annotations can be sent to the other data processing environment using different approaches, for example using Betacam-SP tapes for the master video, and data disks for the master annotations.

Referring to FIG. 8A, in some embodiments, exchange annotations 152 includes additional information regarding the content of exchange signals 150. For example, in the case of a football game, each segment can be categorized according to a class of play used. Exchange annotations 152 then includes an additional table 834 that provides characteristics of each class of plays. A record 839 which identifies a class of play includes references 837 and 838 to records that have definitions of particular plays in that class. For instance, a record for a specific play can include a reference to a portion of exchange signals 150 that hold, for example, or an video animation of the play, a spoken description of the play.

Figure 9A:
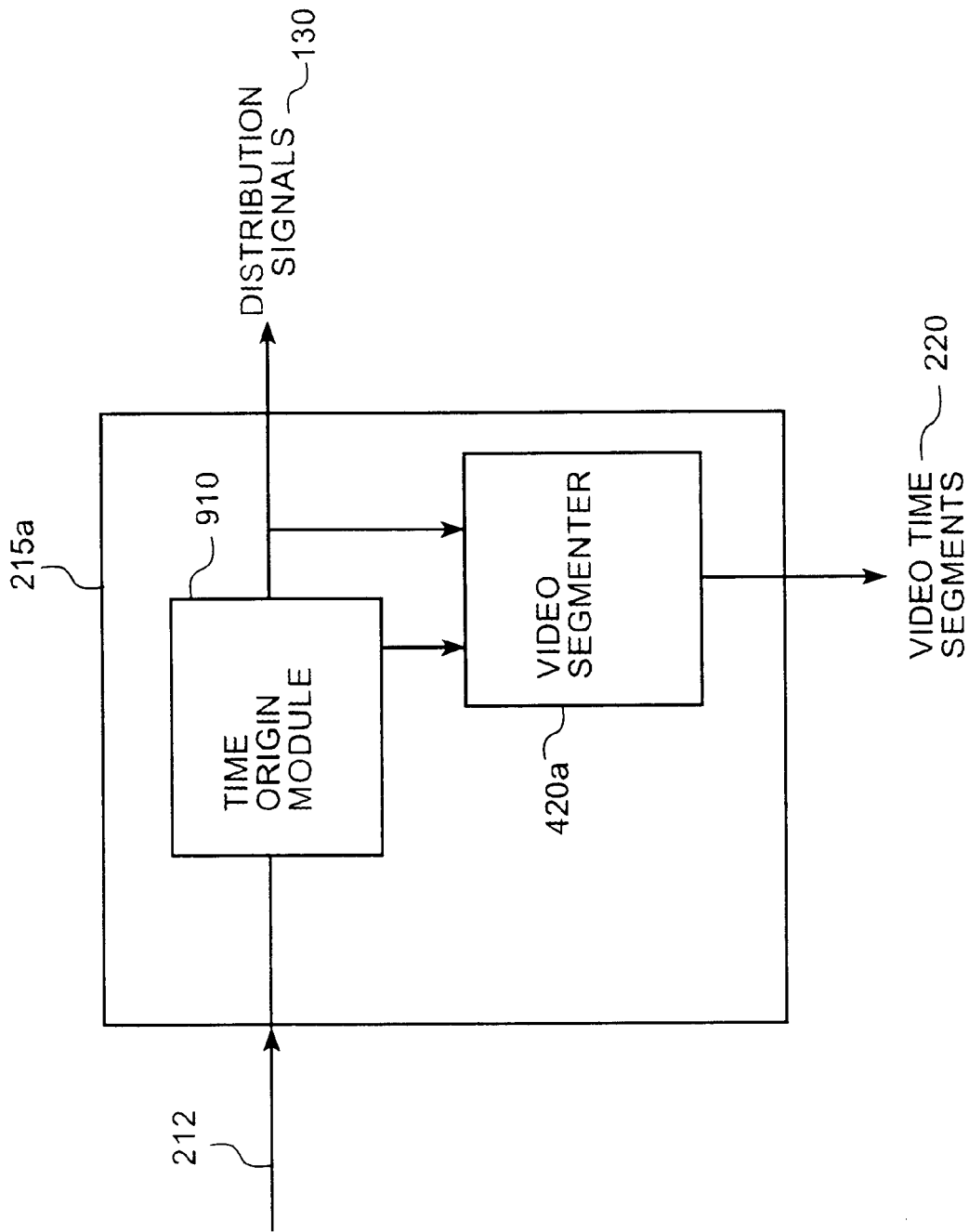
FIG. 9A shows an alternative structure of a signal pre-processor.

4.1 Alternative Embodiments (FIGS. 9A–C)

Referring again to FIG. 2, in some embodiments, a common time signal is not available to both signal pre-processor 215 and annotations pre-processor 230, or even if a time signal is available to signal pre-processor 215, the time signal cannot be transmitted with distribution signals 130. In these embodiments, the signal pre-processor establishes a time origin based on the signals, such as the video signals, that it inputs, while the annotations pre-processor uses an internal time base that is not shared by the signal pre-processor. Segment matcher 240 then determines the relationship between the time reference of the captured annotations and the time reference of the video time segments. This may be done automatically, or using an input from an operator who aligns the two sets of time intervals.

Referring to FIG. 9A, in one such embodiment of signal pre-processor, a signal pre-processor 215a includes a time origin module 910 processes video signals 212 to add synchronization information in the image content of the video signal itself. Referring to FIG. 9B, time origin module 910 logically includes a sync frame module 914 that replaces input video frames with a sequence of synchronization frames (such as all blue images or color bars) at the time origin of the distribution signals 130. A time origin detector 912 determines the point at which this time origin is added. For example, time origin detector 912 accepts input from an operator at the time he wants the time origin, or alternatively, determines the time origin using an automated video-processing technique. Video segmenter 420a then function in a similar manner to video segmenter 420 in FIG. 4, with the exception that the segment intervals are specified with reference to this determined time origin.

Referring to FIG. 9C, an alternative embodiment of the time origin module does not necessarily modify the video signals, but instead has a time origin detector 912a that determines the time origin of the video signal based on the content of the video signal. For example, time origin module 912a identifies the instant of the beginning of the first play of the game based on operator input. This instant can be reproducibly determined, to within a small number of frames accuracy, by a recipient of distribution signals 150 at a remote site.

In these alternative embodiments, signal/annotation synchronizer 635 (see FIG. 6) determines the time origin of the received distribution signals based on the embedded synchronization information in the signals, and then uses this time origin to map the time intervals specified in the distribution annotations to particular portions of the stored distribution signals.

In related alternative embodiments, exchange signals 150 (see FIG. 6) do not include time signals, but rather, the event processing system incorporates synchronization information, such as blue frames, into the exchange signals, and the receiving event processing system determines the time origin of the received exchange signals in order to map the time intervals specified in the exchange annotations to particular portions of he exchange signals.

5 Alternative System Implementions

Referring back to FIG. 2, an alternative implementation of event capture system 110 passes time signal 201 to cameras 210 and console 225. Cameras 210 produce video signals 212 that include the time signal, for example, by passing a recorded tape to video pre-processor 215 rather than passing a live signal. Also, in this alternative, console 225 records the time each character is input (i.e., time stamps the input characters), and passes these characters with their input times to annotations pre-processor 230, for example of a data storage medium (e.g., a floppy disk). In such an arrangement, signal pre-processor 215 and annotations pre-processor 230 do not have to operate in real time during the event.

One alternative implementation of event processing environment 140 is an Avid Sports SportsPro system that includes additional software modules. For example, the software modules implement signal annotation synchronizer 635 and content selector 640. Alternative embodiments can use one or more computers to implement equivalent functionality.

Signal pre-processor 215 can be implemented in a variety of ways, including as software executing of a general-purpose or a special-purpose computer, as special-purpose hardware, or as a combination of special purpose hardware and software. Furthermore, signal pre-processor 215 can also have alternative architectures than those shown in FIGS. 9A–C while providing equivalent functionality. Signal pre-processor 215 can also provide other image processing functions, such as format conversion, mixing of video signals, applied to the video signal before distribution to the remote sites.

Various alternative communication channels or media can be used to transfer distribution signals and distribution annotations from the event capture system to the event processing systems, and various communication channels can be used to pass exchange signals and exchange annotations between event processing systems. These include transferring distribution signals over a television distribution system, such as a private satellite system or a public television broadcast network. In these cases, a time signal would not typically be sent concurrently with the distribution signals, and therefore an approach to synchronization that incorporates the synchronization information into the signals themselves would be used. A variety of storage media can be used to physically transfer recordings of the distribution signals to the event processing systems. The include Betacam tapes, DVD disks, and any of a number of analog or digital video recording formats. In the cases that an accurate time reference can be determined from the signal on the media, synchronization information in embedded in the signals themselves are not necessarily needed. Otherwise, for example using a video recording tape format that only reproduces an NTSC signal and does not provide an accurate frame count from the beginning of the tape can use the method of determining a time origin using the embedded synchronization information.

Distribution annotations can be transferred in a variety of ways. These include on a physical medium, such as a floppy disk, or over a data network, such as the Internet. In addition, the distribution annotations may be transferred indirectly to the event processing systems by first uploading the annotations to a server computer on the Internet, and the by later downloading them to the event processing systems at a later time.

For certain media and channels, distribution signals and distribution annotations can be sent together. For example, both the signals and the annotations can be recorded on a DVD disk and sent to the event processing systems. If adequate data rates are available, both the signals and the annotations can be transferred easily over a data network.

Exchange signals and exchange annotations can be transferred between event processing systems using the same types of channels and media as used for the distribution signals and annotations. In addition, in some embodiments, all the event processing systems receive the distribution signals from the event capture system, for example over a broadcast television network. The event processing systems then only pass exchange annotations without exchange signals. The exchange annotations then reference portions of the original distribution signals received by all the event processing systems.

It is to be understood that the foregoing description is intended to illustrate and not to limit the scope of the invention, which is defined by the scope of the appended claims. Other embodiments are within the scope of the following claims.

What is claimed is:

1. A method for capturing and distributing video information comprising:

accepting a video signal;

identifying a time reference for the video signal;

segmenting the video signal into a plurality of video segments, including forming a plurality of time interval records each identifying a time interval relative to the time reference for each video segment;

accepting an annotation signal associated with the video signal;

processing the annotation signal including forming a plurality of annotation segments, each annotation segment corresponding to a time interval;

matching the annotation segments to the video segments, including updating the annotation segments using the time interval records of corresponding video segments;

distributing the video signal; and distributing the plurality of updated annotation segments.

2. The method of claim 1 wherein identifying a time reference for the video signal includes accepting a time signal in conjunction with the video signal and identifying a time value in the time signal to determine the time reference, and distributing the video signal includes distributing the time signal in conjunction with the video signal.

3. The method of claim 1 wherein identifying a time reference for the video signal includes selecting a point in the video signal using the images encoded in the video signal.

4. The method of claim 1 wherein the method further comprises marking the time reference in the images encoded in the accepted video signal.

5. The method of claim 1 wherein segmenting the video signal include identifying boundary times of the time intervals using images encoded in the video signal.

6. The method of claim 1 further comprising receiving a data signal and wherein segmenting the video signal includes identifying boundary times of the time intervals using the received data signal.

7. The method of claim 1 wherein processing the annotation signal includes identifying time boundaries of the annotation segments.

8. The method of claim 1 wherein processing the annotation signal includes forming descriptive information for each annotation segment from the annotation signal.

9. The method of claim 1 wherein accepting the annotation signal includes receiving text data encoding annotation information, and processing the annotation signal includes parsing the text data to identify the annotation segments.

10. The method of claim 1 wherein accepting the annotation signal includes receiving a speech signal and processing the annotation signal includes automatically recognizing the received speech signal.

11. The method of claim 1 further comprising receiving a data signal and wherein forming the annotation segments further includes processing the data signal to determine the time intervals of the annotation segments.

12. The method of claim 1 wherein matching the annotation segments to the video segments includes associating time intervals of the video segments with time intervals of the annotation segments.

13. The method of claim 1 wherein updating the annotation segments includes updating the boundary times of the annotation segments using the ti me boundaries of associated video segments.

14. The method of claim 1 further comprising:

accepting the distributed video signal;

accepting the distributed annotation segments;

identifying the time reference for the accepted video signal;

selecting one or more annotation segments; and accessing video segments corresponding to the selected annotation segments.

15. The method of claim 14 further comprising accepting a time signal in conjunction with the video signal and wherein identifying the time reference for the accepted video signal includes identifying a reference time in the time signal.

16. The method of claim 14 wherein identifying the time reference for the accepted video signal includes locating a time reference marked in images encoded in the video signals.

17. The method of claim 14 wherein selecting the annotation segments includes accepting a query and matching the query with descriptive information associated with each of the annotation segments.

18. The method of claim 14 wherein distributing the annotation segments include sending the annotation segments to a server computer and accepting the annotation segments includes retrieving the annotation segments over a data network from the server computer.

19. The method of claim 14 further comprising:

forming a second video signal from the accessed video segments; and distributing the second video signal and the selected annotation segments.

20. A system for capturing and distributing video information comprising:

a video processor for accepting a video signal and for segmenting the video signal into a plurality of video segments;

an annotation processor for accepting an annotation signal associated with the video signal and for forming a plurality of annotation segments;

a segment matcher of associating time intervals associated with the video segments and time intervals associated with the annotation segments.

21. The system of claim 1 wherein annotation signal includes text data and the annotation processor includes a parser for processing the text data to form the annotation segments.

22. A method for processing video information comprising:

accepting a video signal;

segmenting the video signal into a plurality of video segments;

accepting an annotation signal associated with the video signal;

forming a plurality of annotation segments from the annotation signal; and matching time intervals associated with the video segments and time intervals associated with the annotation segments.

23. The method of claim 22 wherein the video signal records a live event, and the method includes generating the annotation signal by an observer of the live event.

24. The method of claim 23 wherein the live event is a sporting event, and generating the annotation signal include entering annotations of acts occurring in the sporting event.

25. The method of claim 22 wherein accepting the annotation signal includes receiving text data encoding annotation information.

26. The method of claim 25 wherein processing the annotation signal includes parsing the text data to identify the annotation segments.

27. The method of claim 26 wherein the text data is associated with timing information identifying when the text data was entered.

28. The method of claim 27 wherein processing the annotation signal includes identifying the time interval for each annotation segment according to the timing information.

29. The method of claim 22 further comprising:

distributing the video signal;

updating the annotation segments using the time intervals associated with the video segments; and distributing the updated annotation segments.

30. The method of claim 29 further comprising:

accepting the distributed video signal;

accepting the distributed annotation segments;

selecting one or more annotation segments; and accessing video segments corresponding to the selected annotation segments.

31. The method of claim 30 wherein the video signal and the updated annotation segments are distributed using different communication systems.

* * * * *